US012735558B2

(12) United States Patent
Iyoda et al.

(10) Patent No.: US 12,735,558 B2
(45) Date of Patent: Sep. 15, 2026

(54) RESIN COMPOSITION, POWER CABLE, AND METHOD OF PRODUCING POWER CABLE

(71) Applicant: SUMITOMO ELECTRIC INDUSTRIES, LTD., Osaka (JP)

(72) Inventors: Fumitoshi Iyoda, Osaka (JP); Takanori Yamazaki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 588 days.

(21) Appl. No.: 18/271,902

(22) PCT Filed: Nov. 8, 2021

(86) PCT No.: PCT/JP2021/040903

§ 371 (c)(1),
(2) Date: Jul. 12, 2023

(87) PCT Pub. No.: WO2022/180939

PCT Pub. Date: Sep. 1, 2022

(65) Prior Publication Data

US 2025/0277106 A1 Sep. 4, 2025

(30) Foreign Application Priority Data

Feb. 25, 2021 (JP) ................................ 2021-028226

(51) Int. Cl.
*C08L 23/06* (2006.01)
*C08L 23/12* (2006.01)
(Continued)

(52) U.S. Cl.
CPC ............... *C08L 23/06* (2013.01); *C08L 23/12* (2013.01); *H01B 3/441* (2013.01);
(Continued)

(58) Field of Classification Search
CPC .... C08L 23/06; C08L 23/12; C08L 2203/202; C08L 2205/025; C08L 2205/035; H01B 3/441; H01B 13/06
See application file for complete search history.

(56) References Cited

U.S. PATENT DOCUMENTS

2013/0008691 A1* 1/2013 Shimada .................. H01B 3/28 524/375
2021/0296704 A1 9/2021 Morioka et al.

FOREIGN PATENT DOCUMENTS

CN 108299782 A 7/2018
CN 112391024 A 2/2021
(Continued)

*Primary Examiner* — Shane Fang
(74) *Attorney, Agent, or Firm* — Renner, Otto, Boisselle & Sklar, LLP

(57) ABSTRACT

A resin composition includes a base resin containing polyolefin, a styrene-based elastomer containing styrene units, and a copolymer containing styrene units and maleic anhydride units, wherein a content of the copolymer is 0.5 parts by mass or more with respect to the total content of the base resin and the styrene-based elastomer being 100 parts by mass, a content of the styrene-based elastomer is equal to or more than the content of the copolymer, and the copolymer does not contain side chains that are eliminated by pyrolysis or hydrolysis at 300° C. or less.

16 Claims, 1 Drawing Sheet

(51) Int. Cl.
*H01B 3/44* (2006.01)
*H01B 13/06* (2006.01)

(52) U.S. Cl.
CPC ... *C08L 2203/202* (2013.01); *C08L 2205/025* (2013.01); *C08L 2205/035* (2013.01); *H01B 13/06* (2013.01)

(56) References Cited

FOREIGN PATENT DOCUMENTS

| | | | |
|---|---|---|---|
| EP | 0674325 | A2 | 9/1995 |
| JP | 07-149959 | A | 6/1995 |
| JP | 08-339717 | A | 12/1996 |
| JP | 10-064338 | A | 3/1998 |
| JP | H11-16421 | | 1/1999 |
| JP | 2002-212354 | A | 7/2002 |
| JP | 2005-135788 | A | 5/2005 |
| JP | 2007211106 | A | 8/2007 |
| JP | 2020-26386 | A | 2/2020 |
| WO | 2020/137388 | A1 | 7/2020 |

* cited by examiner

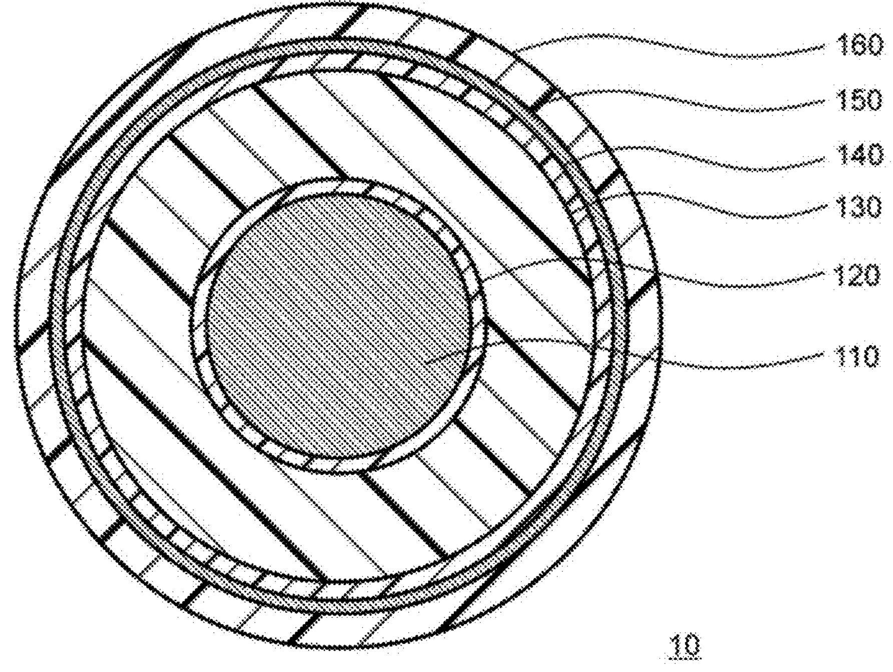
160
150
140
130
120
110
10

RESIN COMPOSITION, POWER CABLE, AND METHOD OF PRODUCING POWER CABLE

TECHNICAL FIELD

The present disclosure relates to a resin composition, a power cable, and a method of producing the power cable.

The present application claims priority based on Japanese Laid-Open Patent Publication No. 2021-28226 filed on Feb. 25, 2021, the content of which is incorporated herein by reference in its entirety.

BACKGROUND ART

In recent years, solid-insulated power cables (hereinafter abbreviated as "power cables") have been developed for DC power transmission applications (e.g., PTL. 1).

CITATION LIST

Patent Literature

[PTL. 1] Japanese Patent Laid-Open Publication No. H11-16421

SUMMARY OF INVENTION

Solution to Problem

According to an aspect of the present disclosure, there is provided a resin composition, including:

a base resin containing polyolefin;

a styrene-based elastomer containing styrene units; and a copolymer containing styrene units and maleic anhydride units, wherein a content of the copolymer is 0.5 parts by mass or more with respect to a total content of the base resin and the styrene-based elastomer being 100 parts by mass, a content of the styrene-based elastomer is equal to or more than the content of the copolymer, and the copolymer does not contain a side chain that is eliminated by pyrolysis or hydrolysis at 300° C. or less.

According to another aspect of the present disclosure, there is provided a power cable, including:

a conductor; and an insulating layer provided to cover a circumference of the conductor, wherein the insulating layer includes a resin composition having a base resin containing polyolefin, a styrene-based elastomer containing styrene units, and a copolymer containing styrene units and maleic anhydride units, a content of the copolymer in the insulating layer is 0.5 parts by mass or more with respect to the total content of the base resin and the styrene-based elastomer being 100 parts by mass, a content of the styrene-based elastomer in the insulating layer is equal to or more than the content of the copolymer, and the copolymer does not contain a side chain that is eliminated by pyrolysis or hydrolysis at 300° C. or less.

According to yet another aspect of the present disclosure, there is provided a power cable including:

a conductor; and an insulating layer provided to cover a circumference of the conductor;

wherein the insulating layer includes a resin composition having a base resin containing polyolefin, a styrene-based elastomer containing styrene units, and a copolymer containing styrene units and maleic anhydride units, a total content of the maleic anhydride units in the insulating layer is set to 0.1 parts by mass or more with respect to a total content of the base resin and the styrene-based elastomer being 100 parts by mass, a content of the styrene-based elastomer in the insulating layer is equal to or more than the content of the copolymer, and the copolymer does not contain a side chain that is eliminated by pyrolysis or hydrolysis at 300° C. or less.

According to yet another aspect of the present disclosure, there is provided a method of producing a power cable, including:

preparing a resin composition having a base resin containing polyolefin, a styrene-based elastomer containing styrene units, and a copolymer containing styrene units and maleic anhydride units; and forming an insulating layer with the resin composition to cover an outer circumference of a conductor, wherein, in the preparation of the resin composition, a content of the copolymer in the resin composition is set to 0.5 parts by mass or more with respect to a total content of the base resin and the styrene-based elastomer being 100 parts by mass, a content of the styrene-based elastomer in the resin composition is set to be equal to or more than the content of the copolymer, and the copolymer is a material without containing a side chain that is eliminated by pyrolysis or hydrolysis at 300° C. or less.

According to yet another aspect of the present disclosure, there is provided a method of producing a power cable, including:

preparing a resin composition having a base resin containing polyolefin, a styrene-based elastomer containing styrene units, and a copolymer containing styrene units and maleic anhydride units; and forming an insulating layer with the resin composition to cover an outer circumference of a conductor, wherein, in the preparation of the resin composition, a total content of the maleic anhydride units in the resin composition is set to 0.1 parts by mass or more with respect to a total content of the base resin and the styrene-based elastomer being 100 parts by mass, a content of the styrene-based elastomer in the resin composition is set to be equal to or more than the content of the copolymer, and the copolymer is a material without containing a side chain that is eliminated by pyrolysis or hydrolysis at 300° C. or less.

BRIEF DESCRIPTION OF DRAWINGS

The FIGURE is a schematic cross-sectional view orthogonal to an axial direction of a DC power cable according to an embodiment of the present disclosure.

DESCRIPTION OF EMBODIMENTS

Problem to be Solved by Disclosure

An object of the present disclosure is to obtain stable insulation properties of the insulating layer.

Advantageous Effect of Disclosure

According to the present disclosure, stable insulation properties of the insulating layer can be obtained.

Description of Embodiment of Disclosure

<Knowledges Obtained by the Inventors>

First, the knowledges obtained by the inventors will be described.

In DC power cables, for example, space charges are generated in the insulating layer upon application of high voltage, so that the insulation properties of the insulating layer may be possibly degraded. (Note that the term "insulation properties" of the insulating layer used herein means a volume resistivity, a DC breakdown electric field strength, space charge characteristics, and the like, and is also referred to as "DC characteristics").

Conventionally, in order to suppress the accumulation of space charges in the insulating layer of the DC power cable as described above, various countermeasures have been attempted. As a result of the intensive study, however, the present inventors have found that the following new problems may arise.

(i) For Addition of Inorganic Fillers

In order to suppress the accumulation of space charges in the insulating layer of the DC power cable, a polar inorganic filler such as carbon black or magnesium oxide (MgO) may be sometimes added to the resin composition constituting an insulating layer, for example (e.g., PTL. 1). In this case, the insulating layer is formed, for example, by extruding the resin composition containing inorganic fillers through a mesh.

However, when such inorganic fillers are added, the mesh sometimes gradually becomes clogged during an insulating layer extrusion step due to agglomeration of the inorganic fillers, depending on production conditions including the particle diameter, surface treatment conditions, and content of the inorganic filler. Clogging of the mesh may increase the resin pressure during the extrusion step. For this reason, the insulation properties of the insulating layer may vary in the length direction of the cable, or moldability of the insulating layer itself may be degraded.

(ii) For Modified Polyolefin

In order to suppress the accumulation of space charges in the insulating layer of the DC power cables, for example, incorporation of an organic polar group into a resin component has been examined. An exemplary method of incorporating a polar group is to add a modified polyolefin such as polyethylene modified with maleic anhydride as a polar group to the resin composition.

However, such modification of polyolefin with maleic anhydride as a side chain requires peroxide. An attempt to increase modification rate (modification amount) of maleic anhydride using peroxide will cause polyolefins to react with each other, leading gelation thereof. Therefore, there is a possibility that the modified polyolefin cannot be molded.

For the reasons described above, it was difficult to increase the modification rate (modification amount) of maleic anhydride in the modified polyolefin. For this reason, it was difficult to ensure a sufficient total content of maleic anhydride in the entire resin composition. As a result, there was a possibility that the local accumulation of space charges cannot be suppressed. In particular, the insulation properties at high temperatures tend to be degraded easily.

The present disclosure is based on the above-described knowledges found by the inventors.

Embodiments of Disclosure

Next, embodiments of the present disclosure will be listed and described.

[1] A resin composition according to an aspect of the present disclosure includes:

a base resin containing polyolefin;

a styrene-based elastomer containing styrene units; and a copolymer containing styrene units and maleic anhydride units, wherein a content of the copolymer is 0.5 parts by mass or more with respect to a total content of the base resin and the styrene-based elastomer being 100 parts by mass, a content of the styrene-based elastomer is equal to or more than the content of the copolymer, and the copolymer does not contain a side chain that is eliminated by pyrolysis or hydrolysis at 300° C. or less.

According to this configuration, stable insulation properties can be obtained.

[2] A power cable according to another aspect of the present disclosure includes:

a conductor; and an insulating layer provided to cover a circumference of the conductor;

wherein the insulating layer includes a resin composition having a base resin containing polyolefin, a styrene-based elastomer containing styrene units, and a copolymer containing styrene units and maleic anhydride units, a content of the copolymer in the insulating layer is 0.5 parts by mass or more with respect to a total content of the base resin and the styrene-based elastomer being 100 parts by mass, a content of the styrene-based elastomer in the insulating layer is equal to or more than the content of the copolymer, and the copolymer does not contain a side chain that is eliminated by pyrolysis or hydrolysis at 300° C. or less.

According to this configuration, stable insulation properties of the insulating layer can be obtained.

[3] In the power cable according to [2], a total content of the maleic anhydride units in the insulating layer is 0.1 parts by mass or more with respect to the total content of the base resin and the styrene-based elastomer being 100 parts by mass.

According to this configuration, space charges can be sufficiently trapped by the maleic anhydride units.

[4] A power cable according to another aspect of the present disclosure includes:

a conductor; and an insulating layer provided to cover a circumference of the conductor;

wherein the insulating layer includes a resin composition having a base resin containing polyolefin, a styrene-based elastomer containing styrene units, and a copolymer containing styrene units and maleic anhydride units, a total content of the maleic anhydride units in the insulating layer is 0.1 parts by mass or more with respect to a total content of the base resin and the styrene-based elastomer being 100 parts by mass, a content of the styrene-based elastomer in the insulating layer is equal to or more than the content of the copolymer, and the copolymer does not contain a side chain that is eliminated by pyrolysis or hydrolysis at 300° C. or less.

According to this configuration, stable insulation properties of the insulating layer can be obtained.

[5] In the power cable according to any one of [2] to [4], the copolymer contains none of the following bonds: an ester-bond, an ether-bond, an amide-bond, a urethane-bond, and a siloxane-bond.

According to this configuration, stable insulation properties of the insulating layer can be obtained.

[6] In the power cable according to any one of [2] to [5], a volume resistivity of a sheet of the insulating layer measured under the condition at a temperature of 90° C. and a DC electric field of 75 kV/mm is $1.0\times10^{15}$ Ω·cm or more.

This configuration enables stable DC power transmission.

[7] In the power cable according to any one of [2] to [6], an accumulated amount of space charges of a sheet of the insulating layer measured under the condition at a temperature of 90° C. and a DC electric field of 75 kV/mm is 100% or less.

This configuration enables stable DC power transmission.

[8] In the power cable according to any one of [2] to [7], a content of the copolymer is less than 20 parts by mass with respect to the total content of the base resin and the styrene-based elastomer being 100 parts by mass.

According to this configuration, deformation at high temperatures can be suppressed.

[9] In the power cable according to [7] or [8], a heat deformation ratio of the insulating layer measured under the condition at a temperature of 120° C. and a load of 2 kg is 40% or less.

According to this configuration, heat resistance can be improved in the shape of the power cable at high temperatures.

[10] In the power cable according to any one of [2] to [9], a content of an inorganic compound contained in the insulating layer is less than 0.01 parts by mass with respect to the total content of the base resin and the styrene-based elastomer being 100 parts by mass.

According to this configuration, clogging of the mesh can be suppressed during the insulating layer extrusion step.

[11] In the power cable according to any one of [2] to [9], the insulating layer further has less than 1 part by mass of an inorganic filler with respect to the total content of the base resin and the styrene-based elastomer being 100 parts by mass.

According to this configuration, it is possible to stably obtain the effect of improving the insulation properties of the insulating layer while suppressing the clogging of the mesh during the extrusion step.

[12] In the power cable according to or [11], the insulating layer satisfies the following equation (1) for a rate of variation in DC breakdown strength:

$$(E_{MAX}-E_{MIN})/E_{AVE}\leq 0.2 \quad (1)$$

where the DC breakdown strength is an electric field strength at which dielectric breakdown occurs in each of a plurality of sheets when a DC electric field is applied under the condition at a temperature of 90° C. to each of the plurality of sheets that are collected from a plurality of positions in the insulating layer, spaced at predetermined intervals in the length direction of the conductor, and $E_{MAX}$, $E_{MIN}$, and $E_{AVE}$ are the maximum, minimum, and average values, respectively, of the DC breakdown strengths of the plurality of sheets.

According to this configuration, the elongated power cable as a whole can obtain stable insulation properties.

[13] In the power cable according to any one of [2] to [12], a glass transition temperature of the copolymer is 110° C. or more.

According to this configuration, mechanical properties of the power cable can be ensured.

[14] In the power cable according to any one of [2] to [13], a glass transition temperature of the copolymer is 140° C. or less.

According to this configuration, it is possible to prevent copolymer (C) from vitrifying (becoming filler-like).

[15] A method of producing a power cable according to another aspect of the present disclosure includes:

preparing a resin composition having a base resin containing polyolefin, a styrene-based elastomer containing styrene units, and a copolymer containing styrene units and maleic anhydride units; and, forming an insulating layer with the resin composition to cover an outer circumference of a conductor, wherein, in the preparation of the resin composition, a content of the copolymer in the resin composition is set to 0.5 parts by mass or more with respect to a total content of the base resin and the styrene-based elastomer being 100 parts by mass, a content of the styrene-based elastomer in the resin composition is set to be equal to or more than the content of the copolymer, and the copolymer is a material without containing a side chain that is eliminated by pyrolysis or hydrolysis at 300° C. or less.

According to this configuration, a power cable having an insulating layer with stable insulation properties can be obtained.

[16] A method of producing a power cable according to another aspect of the present disclosure includes:

preparing a resin composition having a base resin containing polyolefin, a styrene-based elastomer containing styrene units, and a copolymer containing styrene units and maleic anhydride units; and forming an insulating layer with the resin composition to cover an outer circumference of a conductor, wherein, in the preparation of the resin composition, a total content of the maleic anhydride units in the resin composition is set to 0.1 parts by mass or more with respect to a total content of the base resin and the styrene-based elastomer being 100 parts by mass, a content of the styrene-based elastomer in the resin composition is set to be equal to or more than the content of the copolymer, and the copolymer is a material without containing a side chain that is eliminated by pyrolysis or hydrolysis at 300° C. or less.

According to this configuration, a power cable having an insulating layer with stable insulation properties can be obtained.

Details of Embodiment of Disclosure

Next, an embodiment of the present disclosure will be described below with reference to the drawings. Note that the present disclosure is not limited to the following examples, but is defined by the claims, and is intended to encompass all modifications within the meanings and scope that are equivalent to the claims.

One Embodiment of Disclosure (1) Resin Composition

The resin composition of this embodiment is a material constituting an insulating layer 130 of a power cable 10 described later. The resin composition has, for example, a base resin (A), a styrene-based elastomer (B), a copolymer (C), and other additives. Hereinafter, the base resin (A) is also referred to as "component (A)", the styrene-based elastomer (B) as "component (B)", and the copolymer (C) as "component (C)".

[Base Resin (A)]

A base resin (base polymer) refers to a resin component constituting a main component of the resin composition. The "main component" refers to a component with the highest content.

The base resin of this embodiment contains, for example, polyolefin. Examples of polyolefin constituting the base resin include polyethylene, polypropylene, ethylene-α-olefin copolymers, and thermoplastic elastomers (non-styrene-based elastomers) including ethylene-propylene rubber dispersed in or copolymerized with polypropylene. Among them, polyethylene or polypropylene is preferred. Two or more of them may be used in combination.

Examples of polyethylene constituting the base resin include low density polyethylene (LDPE), medium density polyethylene (MDPE), high density polyethylene (HDPE), and the like. In addition, the polyethylene may be either linear or branched, for example.

Examples of polypropylene constituting the base resin include propylene homopolymers (homo polypropylene), and propylene random polymers (random polypropylene). Tacticity is not particularly limited, but is preferably isotactic, for example.

Since the resin composition has the above-described base resin (A), the basic and mechanical properties of the power cable 10 can be ensured.

Moreover, the elastic modulus of the polyolefin measured with a scanning probe microscope (SPM) is preferably 300 MPa or more and 2000 MPa or less. Measurement of the elastic modulus with SPM is performed under conditions of tapping within a 10 μm square area of polyolefin 60000 times at 25° C. with a cantilever having a tip that is made of silicon and has a radius of curvature of less than 20 nm. Since the elastic modulus of polyolefin is within the above-described range, both flexibility and rigidity of the power cable 10 can be achieved.

[Styrene-Based Elastomer (B)]

The styrene-based elastomer (B) contains, for example, at least styrene units as monomer units.

Since the styrene-based elastomer (B) contains styrene units as described above, the compatibility between the styrene-based elastomer (B) and the copolymer (C) containing styrene units described below can be improved. That is, the copolymer (C) can be uniformly dispersed in the base resin (A) while interposing the styrene-based elastomer (B). This makes it possible to easily increase the content of the copolymer (C) in the resin composition.

Since the styrene-based elastomer (B) contains styrene units, space charges can be trapped not only by the maleic anhydride units in the copolymer (C) described below, but also by the aromatic rings included in the styrene units in the styrene-based elastomer (B). As a result, the local accumulation of space charges in the insulating layer can be suppressed.

The styrene-based elastomer (B) is, for example, a copolymer containing styrene unit as a hard segment, and at least one monomer unit of ethylene, propylene, butylene, isoprene, and the like as a soft segment.

Examples of the styrene-based elastomer (B) include styrene-butadiene-styrene block copolymers (SBS), hydrogenated styrene-butadiene-styrene block copolymers, styrene-ethylene-ethylene-propylene-styrene block copolymers (SEEPS), styrene-ethylene-propylene-styrene block copolymers (SEPS), styrene-isoprene-styrene copolymers (SIS), hydrogenated styrene-isoprene-styrene copolymers, hydrogenated styrene-butadiene rubbers, hydrogenated styrene-isoprene rubbers, styrene-ethylene-butylene-olefin crystalline block copolymer. Two or more of them may be used in combination.

The term "hydrogenated" as used herein means hydrogen being added to a double bond. For example, "hydrogenated styrene-butadiene-styrene block copolymer" means a polymer obtained by adding hydrogen to double bonds of the styrene-butadiene-styrene block copolymer. Note that double bonds in the aromatic ring included in styrene has no hydrogen added thereto. The term "hydrogenated styrene-butadiene-styrene block copolymer" can be also referred to as styrene-ethylene butylene-styrene block copolymer (SEBS).

When the base resin contains polyethylene, the styrene-based elastomer (B) among the above-described materials preferably contains ethylene units, for example. This improves the compatibility between the base resin (A) and the styrene-based elastomer (B).

A content of the ethylene unit (also simply referred to as "ethylene content" hereinafter) in the styrene-based elastomer (B) is not particularly limited, but is preferably 10 mass % or more and 50 mass % or less, for example. By setting the ethylene content to 10 mass % or more, the compatibility between the base resin (A) and the styrene-based elastomer (B) can be sufficiently improved. On the other hand, by setting the ethylene content to 50 mass % or less, a predetermined amount of the styrene unit can be ensured. Accordingly, the compatibility between the styrene-based elastomer (B) and the copolymer (C) described below can be sufficiently improved. As a result, the insulation properties at high temperatures can be stably improved.

Among the above-described materials, hydrogenated materials having no double bonds in their chemical structures excluding aromatic rings are preferred. When non-hydrogenated materials are used, the resin component may be thermally deteriorated, for example, at the time of molding of the resin composition, which may degrade the properties of the resulting molded body. In contrast, the use of the hydrogenated material can improve resistance to the thermal deterioration. As a result, the properties of the molded body can be maintained at a higher level.

The styrene-based elastomer (B) has a low elastic modulus. Specifically, the elastic modulus of the styrene-based elastomer (B) measured with SPM is preferably 10 MPa or more and 400 MPa or less, for example. The measurement conditions are the same as those described for the base resin (A). By setting the elastic modulus of the styrene-based elastomer (B) to 10 MPa or more, the insulating layer 130 can be stably molded. On the other hand, by setting the elastic modulus of the styrene-based elastomer (B) to 400 MPa or less, the flexibility of the power cable 10 can be improved.

In addition, the styrene-based elastomer (B) has low crystallinity. Specifically, the styrene-based elastomer (B) has no melting point or a melting point of less than 100° C. The enthalpy of fusion of the styrene-based elastomer (B) is, for example, 50 J/g or less, and preferably, 30 J/g or less.

Note that styrene-modified polyethylene is not suitable as the styrene-based elastomer (B) in this embodiment. The reason is as follows. In order to suppress the local accumulation of space charges (to develop good DC characteristics), it is necessary to finely disperse the copolymer (C) described below in the composition. However, it is difficult to ensure a predetermined amount of grafted styrene units using styrene-modified polyethylene. For example, styrene-grafted polyethylene with 0.1 mass % or more and 10 mass % or less of styrene grafted thereto provides insufficient styrene units. Therefore, it becomes difficult to improve the compatibility between the styrene-based elastomer (B) and the copolymer (C) described below. As a result, the dispersibility of the copolymer (C) may be degraded.

A content of the styrene-based elastomer (B) in the resin composition is, for example, equal to or more than the content of the copolymer (C) described below. When the content of the component (B) is less than the content of the component (C), the styrene-based elastomer (B) cannot be sufficiently interposed in the base resin (A), which makes it difficult to uniformly disperse the copolymer (C). Therefore, there is a possibility that local accumulation of space charges cannot be suppressed. In particular, the insulation properties at high temperatures may be degraded. In contrast, in this embodiment, by setting the content of the component (B) to be equal to or more than the content of the component (C), the copolymer (C) can be uniformly dispersed while sufficiently interposing the styrene-based elastomer (B), in the base resin (A). As a result, the local accumulation of space charges can be suppressed. In particular, the insulation properties at high temperatures can be improved.

Note that the upper limit of the content of the styrene-based elastomer (B) in the resin composition is not limited. However, the content of the styrene-based elastomer (B) is, for example, 40 parts by mass or less, and preferably 30 parts by mass or less, with respect to the total content of the component (A) and the component (B) being 100 parts by mass. In other words, a content of the base resin (A) is 60 parts by mass or more, and preferably 70 parts by mass or more. Accordingly, the basic and mechanical properties of the power cable 10 can be stably ensured.

[Copolymer (C)]

The copolymer (C) contains, for example, styrene units and maleic anhydride units as monomer units. Thus, the maleic anhydride units are incorporated as one type of monomer units constituting the main chain into the copolymer (C) containing the styrene units. Therefore, the copolymer (C) can be molecularly designed freely. This makes it possible to easily increase the content of the maleic anhydride units in a single molecule. As a result, the total content of the maleic anhydride units in the entire resin composition can be increased.

For example, the copolymer (C) does not contain a side chain that is eliminated by pyrolysis or hydrolysis at 300° C. or less. The phrase "a side chain that is eliminated by pyrolysis or hydrolysis at 300° C. or less" used herein means a side chain that may be eliminated from the main chain, for example, in at least any one of an extrusion step of the insulating layer 130, a crosslinking step, an installation environment in which the insulating layer 130 may absorb moisture, and the like. Since the copolymer (C) does not contain the above-described side chain, elimination of the side chain can be suppressed and generation of a low molecular weight component resulting from the side chain can be suppressed even when the resin composition is exposed to high temperature or high humidity in the extrusion step, the crosslinking step, and the high humidity installation environment. Accordingly, the local accumulation of space charges in the low molecular weight component can be suppressed.

Specifically, the copolymer (C) preferably contains none of the following bonds: an ester-bond, an ether-bond, an amide-bond, a urethane-bond, and a siloxane-bond, for example. The ester-bond, ether-bond, amide-bond, urethane-bond, and siloxane-bond existing as a side chain may be eliminated by pyrolysis or hydrolysis at 300° C. or less.

Examples of monomer units containing side chains that are eliminated by pyrolysis or hydrolysis at 300° C. or less as described above include vinyl acetate, allyl ether, and acrylamide.

On the other hand, examples of the monomer units without containing the side chains that are eliminated as described above, in other words, other monomer units that may be contained in the copolymer (C) include olefin, styrene, and maleic anhydride.

For example, the copolymer (C) preferably has no polar groups other than maleic anhydride units. Thus, generation of the low molecular weight components due to the polar groups other than the maleic anhydride units can be suppressed.

Further, the copolymer (C) more preferably consists of styrene units and maleic anhydride units, for example. In other words, the copolymer (C) is more preferably a styrene-maleic anhydride copolymer. That is, by excluding monomer units other than the styrene units and the maleic anhydride units from the copolymer (C), the content of the maleic anhydride units in a single molecule can be increased. As a result, the total content of the maleic anhydride units in the entire resin composition can be easily increased.

A content of the styrene units (also simply referred to as "styrene content" hereinafter) in the copolymer (C) is preferably 50 mass % or more and 90 mass % or less, for example. When the styrene content is less than 50 mass %, the compatibility between the copolymer (C) and the styrene-based elastomer (B) may decrease. In contrast, by setting the styrene content to 50 mass % or more, the compatibility between the copolymer (C) and the styrene-based elastomer (B) can be improved. On the other hand, when the styrene content is more than 90 mass %, the insulating layer 130 may be easily flexibilized and deformed under high temperature conditions. When the styrene content is more than 90 mass %, it is difficult to ensure a predetermined amount of maleic anhydride units. In contrast, by setting the content of the inorganic filler to 90 mass % or less, excessive flexibilization of the insulating layer 130 and excessive deformation of the insulating layer 130 under high temperature conditions can be suppressed. In other words, mechanical properties can be ensured. Further, by setting the styrene content to 90 mass % or less, a predetermined amount of the maleic anhydride units can be ensured. The total content of the maleic anhydride units in the resin composition will be described later.

On the other hand, a content of the maleic anhydride units (also simply referred to as "maleic anhydride content" hereinafter) in the copolymer (C) is preferably 10 mass % or more and 50 mass % or less, for example. By setting the maleic anhydride content to 10 mass % or more, the total content of the maleic anhydride units in the resin composition can be ensured. The total content of the maleic anhydride units in the resin composition will be described later. On the other hand, by setting the maleic anhydride content to 50 mass % or less, a predetermined amount of the styrene units can be ensured. This improves the compatibility between the copolymer (C) and the styrene-based elastomer (B).

The copolymer (C) may contain a predetermined amount of monomer units other than the styrene units and the maleic anhydride units.

The glass transition temperature of the copolymer (C) is, for example, 110° C. or more. Thus, the excessive flexibilization of the power cable 10 can be suppressed. As a result, the mechanical properties of the power cable 10 can be ensured.

On the other hand, the glass transition temperature of the copolymer (C) is, for example, 140° C. or less. Thus, it is possible to prevent the copolymer (C) from vitrifying (becoming filler-like) even under conditions at processing temperatures in the extrusion step of the insulating layer 130, thereby suppressing a local agglomeration of the copolymer (C). As a result, the copolymer (C) can be uniformly dispersed throughout the insulating layer 130.

Further, the elastic modulus of the copolymer (C) measured with SPM is preferably 1300 MPa or more and 3000 MPa or less, for example. The measurement conditions are the same as those described for the base resin (A). By setting the elastic modulus of the copolymer (C) to 1300 MPa or more, the rigidity can be ensured. On the other hand, by setting the elastic modulus of the copolymer (C) to 3000 MPa or less, the flexibility can be ensured.

Here, in this embodiment, the content of the copolymer (C) in the resin composition is high, that is, the total content of the maleic anhydride units in the resin composition is higher than the conventional content.

Specifically, the content of the copolymer (C) in the resin composition is 0.5 parts by mass or more, preferably 4 parts by mass or more, with respect to the total content of the base resin (A) and the styrene-based elastomer (B) being 100 parts by mass. When the content of the copolymer (C) is less than 0.5 parts by mass, it is difficult to sufficiently ensure the total content of the maleic anhydride units in the resin composition. Thus, space charges may not be sufficiently trapped by the maleic anhydride units. In contrast, by setting the content of the copolymer (C) to 0.5 parts by mass or more, the total content of the maleic anhydride units in the resin composition can be sufficiently ensured. Thus, space charges can be sufficiently trapped by the maleic anhydride units. Furthermore, by setting the content of the copolymer (C) to 4 parts by mass or more, the space charges can be stably trapped by the maleic anhydride units.

Further, the total content of the maleic anhydride units in the resin composition is, for example, 0.1 parts by mass or more, and preferably 0.8 parts by mass or more, with respect to a total content of the base resin (A) and the styrene-based elastomer (B) being 100 parts by mass. Thus, space charges can be sufficiently trapped by the maleic anhydride units, as described above. As a result, stable insulation properties of the insulating layer 130 can be obtained. The details of the insulating layer 130 will be described later.

On the other hand, in this embodiment, the content of the copolymer (C) in the resin composition is prevented from becoming excessive.

Specifically, the content of the copolymer (C) in the resin composition is less than 20 parts by mass, and preferably 15 parts by mass or less, with respect to the total content of the base resin (A) and the styrene-based elastomer (B) being 100 parts by mass. When the content of the copolymer (C) is 20 parts by mass or more, the styrene units in the copolymer (C) makes a larger contribution to deformation. As a result, the power cable 10 is easily deformed at high temperatures. In contrast, by setting the content of the copolymer (C) to less than 20 parts by mass, contribution of the styrene units in the copolymer (C) to deformation can be reduced. As a result, deformation of the power cable 10 at high temperatures can be suppressed. Furthermore, by setting the content of the copolymer (C) to 15 parts by mass or less, deformation of the power cable 10 at high temperatures can be stably suppressed.

[Other Additives]

The resin composition of this embodiment may contain the following materials as other additives.

[Crosslinking Agent]

A crosslinking agent is, for example, an organic peroxide. Examples of the organic peroxide include dicumylperoxide, 2,5-dimethyl-2,5-di(t-butylperoxy) hexane, and 1,3-bis(t-butylperoxyisopropyl)benzene. Note that two or more of them may be used in combination.

In the resin composition containing a crosslinking agent, a content of the crosslinking agent is not limited. However, the content of the crosslinking agent is preferably 0.5 parts by mass or more and 3.0 parts by mass or less with respect to the total content of the component (A) and the component (B) being 100 parts by mass. By setting the content of the crosslinking agent to 3.0 parts by mass or less, the resistance to scorch can be ensured.

[Antioxidant]

Examples of the antioxidant include, for example, 2,2-thio-diethylenebis[3-(3,5-di-t-butyl-4-hydroxyphenyl)propionate], pentaerythrityl-tetrakis[3-(3,5-di-t-butyl-4-hydroxyphenyl)propionate], octadecyl 3-(3,5-di-t-butyl-4-hydroxyphenyl)propionate, 2,4-bis-[(octylthio)methyl]-o-cresol, 2,4-bis(n-octylthio)-6-(4-hydroxy-3,5-di-t-butylanilino)-1,3,5-triazine, bis[2-methyl-4-{3-n-alkyl($C_{12}$ or $C_{14}$)thiopropionyloxy}-5-t-butylphenyl]sulfide, and 4,4'-thiobis(3-methyl-6-t-butylphenol). Note that two or more of them may be used in combination.

In the resin composition containing an antioxidant, a content of the antioxidant is not limited. However, the content of the antioxidant is preferably 0.1 parts by mass or more and 0.5 parts by mass or less with respect to the total content of the component (A) and the component (B) being 100 parts by mass.

[Lubricant]

A lubricant acts to improve flowability of the resin composition during the extrusion step of the insulating layer 130. The lubricant of this embodiment is, for example, a fatty acid metal salt, or a fatty acid amide. Examples of the fatty acid metal salts include magnesium stearate, zinc stearate, aluminum stearate, and magnesium montanate. Examples of the fatty acid amide include oleic acid amide, and stearic acid amide. Note that two or more of them may be used in combination.

In the resin composition containing the lubricant, a content of the lubricant is not limited. However, the content of the lubricant is preferably 0.01 parts by mass or more and 0.5 parts by mass or less with respect to the total content of the component (A) and the component (B) being 100 parts by mass.

The resin composition may further include a colorant, for example.

On the other hand, the resin composition of this embodiment does not contain inorganic compounds such as inorganic fillers. The term "inorganic compounds" here refers to compounds other than organic compounds containing organic substituents, and does not encompass fatty acid metal salts described above and the like. That is, in the resin composition of this embodiment, an inorganic filler added to an insulating layer for a general DC power cable is not intentionally mixed, and inorganic compounds are hardly included. Even when an inorganic compound is contained in the resin composition of this embodiment, only a trace amount of the inorganic compound is contained as an inevitable impurity in the resin composition. Specifically, a content of the inorganic compounds contained in the resin composition is less than 0.01 parts by mass with respect to the total content of the base resin (A) and the styrene-based elastomer (B) being 100 parts by mass. Accordingly, clogging of the mesh can be suppressed during the extrusion step of the insulating layer 130.

(2) DC Power Cable

Next, with reference to the FIGURE, the DC power cable of this embodiment will be described. The FIGURE is a cross-sectional view orthogonal to an axial direction of a DC power cable according to this embodiment.

The power cable 10 of this embodiment is configured as a so-called solid-insulated DC power cable, and includes, for example, a conductor 110, an internal semiconductive layer 120, an insulating layer 130, an external semiconductive layer 140, a shielding layer 150, and a sheath 160.

(Conductor (Conductive Part))

The conductor 110 is configured by twisting together a plurality of conductor core wires (conductive core wires) including, for example, pure copper, copper alloy, aluminum, aluminum alloy, or the like.

(Internal Semiconductive Layer)

The internal semiconductive layer 120 is provided so as to cover the outer circumference of the conductor 110. In addition, the internal semiconductive layer 120 has semiconductivity and is configured to suppress electric field concentration on the surface side of the conductor 110. The internal semiconductive layer 120 includes, for example, at least any one of ethylene-based copolymers such as ethylene-ethyl acrylate copolymers, ethylene-methyl acrylate copolymers, ethylene-butyl acrylate copolymers, and ethylene-vinyl acetate copolymers, olefin-based elastomers, the above-described low-crystallinity resins and the like, together with conductive carbon black.

(Insulating Layer)

The insulating layer 130 is provided so as to cover the outer circumference of the internal semiconductive layer 120. The insulating layer 130 includes the above-described resin composition of this embodiment.

When the insulating layer 130 of this embodiment is crosslinked with a crosslinking agent, at least a portion of the base resin (A), the styrene-based elastomer (B) and the copolymer (C) is crosslinked. Note that non-crosslinked portions may remain in the other portions of the component (A), the component (B) and the copolymer (C).

(External Semiconductive Layer)

The external semiconductive layer 140 is provided so as to cover the outer circumference of the insulating layer 130. In addition, the external semiconductive layer 140 has semiconductivity and is configured to suppress electric field concentration between the insulating layer 130 and the shielding layer 150. The external semiconductive layer 140 is constituted by the same material as the internal semiconductive layer 120, for example.

(Shielding Layer)

The shielding layer 150 is provided so as to cover the outer circumference of the external semiconductive layer 140. The shielding layer 150 is, for example, configured by winding a copper tape, or configured as a wire shield formed by winding a plurality of soft copper wires. A tape including rubberized cloth or the like as a raw material may be wound inside or outside the shielding layer 150.

(Sheath)

The sheath 160 is provided so as to cover the outer circumference of the shielding layer 150. The sheath 160 is constituted by polyvinyl chloride or polyethylene, for example.

(Insulation Properties of Insulating Layer)

In this embodiment, since the insulating layer 130 is constituted by the above-described resin composition, stable insulation properties are obtained.

Specifically, the insulating layer 130 of this embodiment satisfies the requirements for the following insulation properties measured under the conditions at high temperatures and high electric field, for example. The measurement is performed, for example, on a sheet taken from a central portion of the insulating layer 130 in the thickness direction. Note that the sheet of the insulating layer 130 has a thickness of 0.2 mm.

A volume resistivity of the sheet of the insulating layer 130 measured under the condition at a temperature of 90° C. and a DC electric field of 50 kV/mm is, for example, $1.0\times10^{15}$ Ω·cm or more, preferably $1.0\times10^{16}$ Ω·cm or more.

An accumulated amount of space charges of the sheet of the insulating layer 130 measured under the condition at a temperature of 90° C. and a DC electric field of 50 kV/mm is, for example, 100% or less, preferably 25% or less.

The accumulated amount of space charges is determined by a direct current integrated charge method. In the direct current integrated charge method, charges are accumulated in a capacitor for measurement connected in series with a sheet as a sample, and a charge amount which is an integrated current value is evaluated. Specifically, a DC electric field of 50 kV/mm is continuously applied to the sample at a temperature of 90° C. Based on the charge amount after 300 seconds $Q_{300}$ and the charge amount immediately after application (0 sec) $Q_0$, an accumulated amount of space charges is determined according to the following equation:

$$\text{Accumulated amount of space charges}=(Q_{300}/Q_0-1)\times100$$

The insulating layer 130 of this embodiment satisfies the following requirements for insulation properties, for example, even under the severer electric field conditions.

A volume resistivity of the sheet of the insulating layer 130 measured under the condition at a temperature of 90° C. and a DC electric field of 75 kV/mm is, for example, $1.0\times10^{15}$ Ω·cm or more, preferably $1.0\times10^{16}$ Ω·cm or more.

An accumulated amount of space charges of the sheet of the insulating layer 130 measured under the condition at a temperature of 90° C. and a DC electric field of 75 kV/mm is, for example, 100% or less, preferably 25% or less.

(Shape Stability)

The insulating layer 130 of this embodiment satisfies the following requirements for shape stability under high temperature conditions, for example.

The heat deformation ratio of the insulating layer 130 measured according to JIS C3005 under the condition at a temperature of 120° C. and a load of 2 kg is 40% or less.

(Extrusion Stability: Insulation Properties in Length Direction)

In addition, when clogging of the mesh in the extrusion step is suppressed, the insulating layer 130 of this embodiment satisfies the requirement for uniform insulation properties throughout the length direction.

Specifically, the insulating layer 130 satisfies, for example, the following equation (1) for the rate of variation in DC breakdown strength:

$$(E_{MAX}-E_{MIN})/E_{AVE}\leq 0.2 \quad (1)$$

where the DC breakdown strength is an electric field strength at which dielectric breakdown occurs in each of a plurality of sheets when a DC electric field is applied under the condition at a temperature of 90° C. to each of the plurality of sheets that are collected from a plurality of positions in the insulating layer 130, spaced at predetermined intervals in the length direction of the conductor 110, and $E_{MAX}$, $E_{MIN}$, and $E_{AVE}$ are the maximum, minimum, and average values, respectively, of the DC breakdown strengths of the plurality of sheets.

(Specific Dimensions and the Like)

Specific dimensions of the power cable 10 are not particularly limited. For example, the diameter of the conductor 110 is 5 mm or more and 75 mm or less, the thickness of the internal semiconductive layer 120 is 0.5 mm or more and 3 mm or less, the thickness of the insulating layer 130 is 1 mm or more and 35 mm or less, the thickness of the external semiconductive layer 140 is 0.5 mm or more and 3 mm or less, the thickness of the shielding layer 150 is 1 mm or more and 5 mm or less, and the thickness of the sheath 160 is 1 mm or more. The DC voltage applied to the power cable 10 of this embodiment is, for example, 20 kV or more.

(3) Method of Producing DC Power Cable

Next, a method of producing the DC power cable of this embodiment will be described. In the following description, step is abbreviated as "S".

(S100: Resin Composition Preparation Step)

First, a resin composition having a base resin (A) containing polyolefin, a styrene-based elastomer (B) containing styrene units, and a copolymer (C) containing styrene units and maleic anhydride units is prepared.

A base resin (A), a styrene-based elastomer (B), a copolymer (C), and other additives are mixed (kneaded) in a mixer such as a Banbury mixer or a kneader, to form a mixed material. After the mixed material is formed, the mixed material is granulated by an extruder. As a result, pellet of the resin compositions are formed which are to constitute the insulating layer 130. Note that the steps from mixing to granulation may be collectively performed using a twin-screw extruder with high kneading performance.

In this case, in this embodiment, the content of the copolymer (C) in the resin composition is set to 0.5 parts by mass or more and less than 20 parts by mass with respect to the total content of the base resin (A) and styrene-based elastomer (B) being 100 parts by mass.

Alternatively, a total content of the maleic anhydride units in the resin composition is set to 0.1 parts by mass or more and less than 4 parts by mass with respect to the total content of the base resin (A) and the styrene-based elastomer (B) being 100 parts by mass.

In this case, in this embodiment, a content of the styrene-based elastomer (B) in the resin composition is set to be equal to or more than the content of the copolymer (C).

In this case, in this embodiment, the copolymer (C) is a material without containing a side chain that is eliminated by pyrolysis or hydrolysis at 300° C. or less.

(S200: Conductor Preparation Step)

Meanwhile, the conductor 110 formed by twisting a plurality of conductor core wires together is prepared.

(S300: Cable Core Formation Step (Extrusion Step))

For example, a resin composition for the internal semiconductive layer in which ethylene-ethyl acrylate copolymer and electrically conductive carbon black are mixed in advance is then charged into an extruder A of a three-layer coextruder, the extruder A forming the internal semiconductive layer 120.

The pellets of the resin composition described above is charged into an extruder B forming the insulating layer 130.

A resin composition for the external semiconductive layer is charged into an extruder C forming the external semiconductive layer 140, the composition including materials similar to those of the resin composition for the internal semiconductive layer charged into the extruder A.

Then, the respective extrudates from the extruders A to C are guided to a common head, and the internal semiconductive layer 120, the insulating layer 130, and the external semiconductive layer 140, outwardly from the inside, are simultaneously extruded on the outer circumference of the conductor 110.

In this embodiment, thereafter, the insulating layer 130 is crosslinked by heating with radiation from an infrared heater or heat-transferring through a heat medium such as high-temperature nitrogen gas or silicone oil, in a crosslinking tube pressurized with nitrogen gas or the like. Thus, a cable core constituted by the conductor 110, the internal semiconductive layer 120, the insulating layer 130, and the external semiconductive layer 140 is formed.

(S400: Shielding Layer Formation Step)

Next, the shielding layer 150 is formed outside the external semiconductive layer 140, for example, by winding a copper tape therearound.

(S500: Sheath Formation Step)

Then, vinyl chloride is charged into an extruder, and extruded from the extruder to form a sheath 160 on the outer circumference of the shielding layer 150.

As described above, the power cable 10 as the solid-insulated DC power cable is produced.

(4) Effects According to this Embodiment

According to this embodiment, one or more effects described below are achieved.

(a) In this embodiment, the resin composition constituting the insulating layer 130 includes a base resin (A) containing polyolefin, a styrene-based elastomer (B) containing styrene units, and a copolymer (C) containing styrene units and maleic anhydride units. The maleic anhydride units are incorporated as one type of monomer units constituting the main chain into the copolymer (C) containing the styrene units. Therefore, the copolymer (C) can be molecularly designed freely. This makes it possible to easily increase the content of the maleic anhydride units in a single molecule.

By mixing the copolymer (C) with the base resin (A) together with the styrene-based elastomer (B) described above, the total content of the maleic anhydride units in the entire insulating layer 130 can be increased, while the maleic anhydride is uniformly dispersed in the insulating layer 130. Thus, space charges can be trapped by the maleic anhydride units as polar groups uniformly dispersed in the insulating layer 130. That is, the local accumulation of space charges can be suppressed in the insulating layer 130.

As described above, by suppressing the local accumulation of space charges, stable insulation properties of the insulating layer 130 can be obtained. Specifically, the insulating layer 130 can be made high-withstand-voltage even at high temperatures. As a result, the power cable 10 of this embodiment enables stable DC power transmission.

(b) The content of the copolymer (C) in the resin composition (i.e., in the insulating layer 130) is 0.5 parts by mass or more with respect to the total content of the base resin (A) and the styrene-based elastomer (B) being 100 parts by mass. This makes it possible to easily ensure the total content of the maleic anhydride units in the insulating layer 130. Specifically, the total content of the maleic anhydride units in the resin composition can be set to 0.1 parts by mass or more.

By setting the total content of the maleic anhydride units to 0.1 parts by mass or more, the space charges can be sufficiently trapped by the maleic anhydride units. As a result, the insulating layer 130 can be made high-withstand-voltage even at high temperatures.

(c) The content of the styrene-based elastomer (B) in the resin composition (i.e., in the insulating layer 130) is equal to or more than the content of the copolymer (C). Thus, the copolymer (C) can be uniformly dispersed in the base resin (A) while sufficiently interposing the styrene-based elastomer (B). As a result, the local accumulation of space charges can be suppressed. As described above, the insulation properties, particularly at high temperature, can be improved.

(d) The copolymer (C) does not contain a side chain that is eliminated by pyrolysis or hydrolysis at 300° C. or less.

Now, the copolymer (C) containing a side chain that is eliminated by pyrolysis or hydrolysis at high temperatures will be discussed. In this case, when the resin composition is exposed to high temperature or high humidity at least in any of the extrusion step, the crosslinking step, and a high humidity installation environment in which the insulating layer may absorb moisture, the side chain is eliminated, and a low molecular weight component resulting from the side chain is generated in the insulating layer. Generation of such a low molecular weight component leads to local accumulation of space charges in the low molecular weight component in the insulating layer. In other words, even when the maleic anhydride units are dispersed as polar groups in the copolymer (C) described above, portions may be generated in which space charge trapping effect by the dispersed maleic anhydride cannot be obtained.

In contrast, in this embodiment, since the copolymer (C) does not contain the above-described side chain, elimination of the side chain can be suppressed and generation of a low molecular weight component resulting from the side chain can be suppressed even when the resin composition is exposed to high temperature or high humidity in the extrusion step, the crosslinking step, and the like. As a result, the accumulation of space charges in the low molecular weight component can be suppressed. That is, the space charge trapping effect by the dispersed maleic anhydride can be uniformly obtained.

(e) The content of the copolymer (C) in the resin composition (i.e., in the insulating layer 130) is less than 20 parts by mass with respect to the total content of the base resin (A) and the styrene-based elastomer (B) being 100 parts by mass. Thus, contribution of the styrene units in the copolymer (C) to deformation can be reduced. As a result, deformation of the power cable 10 at high temperatures can be suppressed. That is, heat resistance can be improved in the shape of the power cable 10 at high temperatures as well.

(f) In this embodiment, the insulating layer 130 does not contain inorganic compounds such as inorganic fillers. Specifically, a content of the inorganic compounds in the insulating layer 130 is less than 0.01 parts by mass with respect to the total content of the base resin (A) and the styrene-based elastomer (B) being 100 parts by mass. Accordingly, clogging of the mesh can be suppressed during the extrusion step of the insulating layer 130.

In the extrusion step of the insulating layer 130, by suppressing clogging of the mesh, variation in the insulation properties of the insulating layer 130 in the length direction of the conductor 110 can be reduced. In addition, the degradation of moldability of the insulating layer 130 itself can be reduced.

As a result, an elongated power cable can be produced by a continuous extrusion step, and the elongated power cable as a whole can obtain stable insulation properties.

(5) Modified Examples of Disclosure

The embodiment described above can be modified as in the following modified examples, if necessary.

Hereinafter, only the elements different from the above-described embodiments will be described, and the elements substantially the same as the elements described in the above-described embodiments are designated by the same reference numerals and the description thereof will be omitted.

Modified Example 1

In modified example 1, the base resin (A) may further contain, for example, a maleic anhydride-modified polyolefin in which maleic anhydride is grafted onto polyolefin.

The polyolefin constituting the maleic anhydride-modified polyolefin is the same polyolefin as the other polyolefin included in the base resin (A), for example. Specifically, the polyolefin constituting the maleic anhydride-modified polyolefin is, for example, polyethylene.

A modification rate (copolymerization rate) of the maleic anhydride to the polyolefin in the maleic anhydride-modified polyolefin is not particularly limited, but is 0.1% or more and 5% or less, for example. By setting the modification rate of maleic anhydride to polyolefin to 0.1% or more, compatibility between the base resin (A) and the copolymer (C) can be improved, and the copolymer (C) can be uniformly dispersed. On the other hand, by setting the modification rate of maleic anhydride to polyolefin to 5% or less, the insulating layer 130 can be stably molded.

The content of the maleic anhydride-modified polyolefin in the resin composition is not particularly limited, but 1 part by mass or more and 10 parts by mass or less with respect to the total content of the component (A) and the component (B) being 100 parts by mass, for example. By setting the content of the maleic anhydride-modified polyolefin to 1 part by mass or more, the compatibility between the base resin (A) and the copolymer (C) can be improved, and the copolymer (C) can be uniformly dispersed. On the other hand, by setting the content of the maleic anhydride-modified polyolefin to 10 parts by mass or less, the insulating layer 130 can be stably molded.

According to modified example 1, since the base resin (A) further contains the maleic anhydride-modified polyethylene, the total content of the maleic anhydride units in the entire insulating layer 130 can be further increased. In addition, since the base resin (A) further contains the maleic anhydride-modified polyethylene, the compatibility between the copolymer (C) containing the maleic anhydride units and the base resin (A) can be improved. This makes it possible to uniformly disperse the maleic anhydride in the insulating layer 130. As a result, local accumulation of space charges can be stably suppressed in the insulating layer 130.

Modified Example 2

In modified example 2, the resin composition may further contain the inorganic filler in such a small amount that clogging of the mesh does not occur during the extrusion step.

Examples of the inorganic filler include at least any one of magnesium oxide (MgO), silicon dioxide, zinc oxide, aluminum oxide, titanium oxide, zirconium oxide, carbon black, and a mixture of two or more of them.

Examples of a method of forming magnesium oxide include a vapor phase method in which Mg vapor and oxygen are brought into contact with each other, or a seawater method in which magnesium oxide is formed from seawater as a raw material. The method of forming the inorganic filler in this embodiment may be either a vapor phase method or a seawater method.

Examples of silicon dioxide include at least any one of fumed silica, colloidal silica, precipitated silica, and vaporized metal combustion (VMC) silica. Among them, fumed silica is preferable as silicon dioxide.

In this modified example, the content of the inorganic filler in the resin composition is, for example, less than 1 part by mass with respect to the total content of the component (A) and the component (B) being 100 parts by mass. By setting the content to be small as described above, clogging of the mesh during the extrusion step can be suppressed.

In this modified example, the lower limit of the content of the inorganic filler is not limited as long as the inorganic filler can be added.

In this modified example, the mean volume diameter (MV) of the inorganic filler (X as described below) is not particularly limited, but is, for example, 1 μm or less, preferably 700 nm or less, and more preferably 100 nm or less.

The term "mean volume diameter (MV)" used herein is determined by the following equation:

$$MV = \Sigma(V_i d_i)/\Sigma V_i$$

wherein di is a particle diameter of the particle and $V_i$ is a volume of the particle.

For a measurement of the mean volume diameter, a dynamic light scattering-type particle diameter and particle size distribution measuring device may be used.

Note that the lower limit of the mean volume diameter of the inorganic filler is not particularly limited.

However, from the viewpoint of stably forming the inorganic filler, the mean volume diameter of the inorganic filler is, for example, 1 nm or more, and preferably 5 nm or more.

In this modified example, at least a portion of the inorganic filler may be surface-treated with a silane coupling agent. It is possible to improve adhesiveness at an interface between the inorganic filler and the base resin, and improve the mechanical and insulation properties of the insulating layer 130.

According to modified example 2, since the resin composition further contains a small amount of the inorganic filler, the effect of improving the insulation properties of the insulating layer 130 can be stably obtained while suppressing the clogging of the mesh during the extrusion step.

Other Embodiment of Disclosure

Although embodiment of the present disclosure has been specifically described, the present disclosure is not limited to the embodiments described above, and various modifications can be made without departing from the gist of the present disclosure.

The above-described embodiments and modified examples describe cases where the base resin (A) contains the polyolefin and cases where the base resin (A) further contains the maleic anhydride-modified polyolefin, respectively. The resin composition may contain, in addition to them, a copolymer of an olefin and a polar monomer as the base resin (A). Examples of the copolymer of olefin and polar monomer include ethylene-ethyl acrylate copolymer, ethylene-methyl acrylate copolymer, ethylene-butyl acrylate copolymer, ethylene-methyl methacrylate copolymer, and ethylene-glycidyl methacrylate copolymer. Note that two or more of them may be used in combination.

The above-described embodiments and modified examples describe cases where the resin composition contains an additive such as a crosslinking agent and the insulating layer 130 is crosslinked with the crosslinking agent, but the insulating layer 130 does not have to be crosslinked.

Particularly, with the base resin (A) containing polypropylene, the insulating layer 130 may be non-crosslinked. In this event, the insulating layer 130, even non-crosslinked one, can achieve insulation properties required for a power cable 10. In addition, since the insulating layer 130 is non-crosslinked, the insulating layer 130 can be recycled.

When the base resin contains polypropylene, among the above-described materials, the styrene-based elastomer (B) preferably contains at least either of the propylene units and the butylene units, for example. This can improve the compatibility between the base resin (A) and the styrene-based elastomer (B).

EXAMPLES

Next, examples according to the present disclosure will be described. These examples are illustrative of the present disclosure, and the present disclosure is not limited by these examples.

(1) Power Cable Samples

According to the following procedures, a power cable of each of samples A1 to A11, and B1 to B9 was produced.

(1-1) Production of Resin Composition

The following materials were mixed using a Banbury mixer and granulated using an extruder to produce pellets of a resin composition.

[Base Resin (A)]

Low density polyethylene (LDPE) (density d=0.920 g/cm$^3$; MFR=1 g/10 min; SPM elastic modulus, 500 MPa): 0 parts by mass or more and 100 parts by mass or less Polypropylene (propylene random polymer; isotactic; density d=0.900 g/cm$^3$; MFR=0.6 g/10 min, SPM elastic modulus, 1100 MPa): 0 or 98 parts by mass Maleic anhydride-modified polyethylene (modification rate, 0.3%; SPM elastic modulus, 500 MPa): 0 or 5 parts by mass

[Styrene-based Elastomer (B)]

- B1, B2, and B3: Hydrogenated styrene-butadiene-styrene block copolymer (SEBS) (hereinafter, numerical values corresponding to B1, B2, and B3 appear in this order)
- Ethylene content in component (B): 20 mass %, 37 mass %, 44 mass %
- Styrene content in component (B): 65 mass %, 40 mass %, 30 mass %
- SPM Elastic modulus of component (B): 50 MPa, 300 MPa, 100 MPa
- Content of component (B): 0 parts by mass or more and 30 parts by mass or less Note that the total content of the component (A) and the component (B) is considered as 100 parts by mass.

[Copolymer (C)]

- C1 and C2: Styrene-maleic anhydride copolymer (glass transition temperature: 115° C.)
- Others: Styrene-maleic anhydride-allyl ether copolymer (glass transition temperature: 115° C.)
- Styrene content in C1 and C2: 75 mass %, 80 mass %, respectively
- Maleic anhydride content in C1 and C2: 25 mass %, 20 mass %, respectively
- SPM Elastic modulus of C1 and C2: 1500 MPa, 1300 MPa, respectively
- Content of component (C): 0 parts by mass or more and 20 parts by mass or less
- Maleic anhydride content in styrene-maleic anhydride-allyl ether copolymer: 25 mass %

The "SPM elastic modulus" described above means the elastic modulus measured with SPM. The measurement of elastic modulus with SPM is performed under conditions of tapping within a 10 μm square area of polyolefin 60000 times at 25° C. with a cantilever having a tip that is made of silicon and has a radius of curvature of less than 20 nm.

[Other Additives]

(Inorganic Filler)

- Material: Magnesium oxide (MgO) manufactured by a vapor phase method (mean volume diameter 50 nm)
- Content of inorganic filler: 0 parts by mass or more and 2 parts by mass or less (Antioxidant)

- Material: Phenolic antioxidant (4,4'-thiobis(3-methyl-6-t-butylphenol))
- Content of antioxidant: 0 parts by mass or more and 0.3 parts by mass or less (Lubricant)

- Material: Fatty acid amide
- Content of lubricant: 0 parts by mass or more and 0.01 parts by mass or less (Crosslinking Agent)

- Material: Organic peroxide, (2, 5-dimethyl-2,5-di(tert-butylperoxy) hexane)
- Content of crosslinking agent: 0 parts by mass or more and 1.5 parts by mass or less (1-2) Production of Power Cable Sample Next, a conductor formed by twisting conductor core wires having a diameter of 14 mm and made of a dilute copper alloy was prepared. After the conductor was prepared, a resin composition for an internal semiconductive layer including an ethylene-ethyl acrylate copolymer, a resin composition for an insulating layer prepared in (1-1) described above, and a resin composition for an external semiconductive layer including a similar material to the resin composition for the internal semiconductive layer were respectively charged into extruders A to C. The respective extrudates from the extruders A to C were guided to a common head, and the internal semiconductive layer, the insulating layer, and the external semiconductive layer, outwardly from the inside, were simultaneously extruded on the outer circumference of the conductor. At this time, the thicknesses of the internal semiconductive layer, the insulating layer, and the external semiconductive layer were 1 mm, 14 mm, and 1 mm, respectively. Thereafter, the above-described extrusion-molded product was heated at about 250° C. to crosslink the resin composition for the insulating layer. As a result, a power cable sample including the conductor, the internal semiconductive layer, the insulating layer, and the external semiconductive layer from the center toward the outer circumference was produced.

Through the steps described above, power cable samples A1 to A11 and B1 to B9 including different resin compositions were produced.

(2) Evaluation

The following evaluation was performed on each of the power cable samples A1 to A11 and B1 to B9. A "rate of increase of resin pressure" described later was evaluated in the insulating layer extrusion step.

[Sample Processing]

In each of the power cable samples A1 to A11 and B1 to B9, the insulating layer was thinly sliced from the outer circumferential surface at the position within 100 m from the initial extrusion position of the insulating layer. Next, a sheet of the insulating layer having a thickness of 0.20 mm was formed from the central portion in the thickness direction of the insulating layer. At this time, a plurality of sheets were formed from almost the same circumference.

In the evaluation of the insulation properties in the length direction described below, a sheet was taken at each of 10 positions in the insulating layer, spaced at 100 m interval in the length direction of the conductor, thus obtaining 10 sheets in total. Note that the sheet was taken from the central portion in the thickness direction at each sampling position.

[Space Charge Characteristics]

The accumulated amount of space charges was determined by a direct current integrated charge method described above. Specifically, a DC electric field of 50 kV/mm was continuously applied to each sample at a temperature of 90° C., and the accumulated amount of space charges (%) was determined by the above-described equation based on the amount of charges after 300 seconds $Q_{300}$ and the amount of charges immediately after application (0 seconds) $Q_0$. A case where the accumulated amount of space charges was 25% or less was evaluated as A (best), and a case where the accumulated amount of space charges was more than 25% and 100% or less was evaluated as B (good), and a case where the accumulated amount of space charges was more than 100% was evaluated as C (bad).

[Volume Resistivity]

The sheet of the insulating layer described above was immersed in silicone oil at a temperature of 90° C., and a DC electric field of 50 kV/mm or 75 kV/mm was applied to the sheet of the insulating layer using flat plate electrodes having a diameter of 25 mm to measure the volume resistivity. A case where the volume resistivity was $1\times10^{16}$ Ω·cm or more was evaluated as A (best), a case where the volume resistivity was $1\times10^{15}$ Ω·cm or more and less than $1\times10^{16}$ Ω·cm was evaluated as B (good), and a case where the volume resistivity was less than $1\times10^{15}$ Ω·cm was evaluated as C (bad).

[DC Breakdown Strength]

The sheet of the insulating layer was immersed in silicone oil at a temperature of 90° C., and an applied voltage was increased at a rate of 4 kV/min using flat plate electrodes having a diameter of 25 mm. A voltage applied when dielectric breakdown occurred in the sheet of the insulating layer was divided by the thickness of the sheet to obtain a DC breakdown field strength of the sheet of the insulating layer. A case where the DC breakdown strength was 200 kV/mm or more was evaluated as A (best), a case where the DC breakdown strength was 160 kV/mm or more and less than 200 kV/mm was evaluated as B (good), and a case where the DC breakdown strength was less than 160 kV/mm was evaluated as C (bad).

[Heat Deformation Ratio]

The heat deformation ratio of the sheet of the insulating layer 130 was measured according to JIS C3005 under the condition at a temperature of 120° C. and a load of 2 kg. A case where the heat deformation ratio was 40% or less was evaluated as A (good), and a case where the heat deformation ratio was more than 40% was evaluated as B (bad).

[Extrusion Stability: Rate of Increase of Resin Pressure]

In the above-described insulating layer extrusion step, the rate of increase of resin pressure was measured. Note that the resin pressure increase rate is a ratio (%) of the resin pressure after 2 hours to the initial resin pressure. A case where the rate of increase of resin pressure was 1% or less was evaluated as A (good), and a case where the rate of increase of resin pressure was more than 1% was evaluated as B (bad).

[Extrusion Stability: Insulation Properties in Length Direction]

As described above, the DC breakdown strength was measured on each of 10 sheets that are collected from 10 positions in the insulating layer, spaced at predetermined intervals in the length direction of the conductor, under the measurement conditions similar to the measurement conditions described in [DC Breakdown Strength] mentioned above. That is, the DC breakdown strength is an electric field strength at which dielectric breakdown occurs in a sheet when a DC electric field is applied under the condition at a temperature of 90° C. to the sheet. From these results, the rate of variation in DC breakdown strength (%) was determined according to the equation:

$$\{(E_{MAX}-E_{MIN})/E_{AVE}\}\times 100$$

A case where the rate of variation in DC breakdown strength was 20% or less was evaluated as A (good), and a case where the rate of variation in DC breakdown strength was more than 20% was evaluated as B (bad).

(3) Results

The results of the evaluation of the power cable samples are illustrated in Tables 1 and 2 below. In Tables 1 and 2, the unit of the content of each material is "parts by mass". A "ratio of the component (B)/component (C)" means a ratio of a content of the component (B) to a content of the component (C).

TABLE 1

| | | A1 | A2 | A3 | A4 | A5 | A6 |
|---|---|---|---|---|---|---|---|
| Low density polyethylene | | 80 | 90 | 90 | 95 | 95 | 95 |
| Polypropylene | | | | | | | |
| Maleic anhydride-modified polyethylene | Modification rate 0.3% | | | | | | |
| Styrene-based elastomer B1 | Ethylene content 20 mass % | | | | 5 | | |
| Styrene-based elastomer B2 | Ethylene content 37 mass % | | | | | 5 | |
| Styrene-based elastomer B3 | Ethylene content 44 mass % | 20 | 10 | 10 | | | 5 |
| Styrene-maleic anhydride copolymer C1 | Styrene content 75 mass % | | 4 | | | | |
| Styrene-maleic anhydride copolymer C2 | Styrene content 80 mass % | 15 | | 4 | 2 | 2 | 2 |
| Styrene-maleic anhydride-allyl ether copolymer | | | | | | | |
| Magnesium oxide | | | | | | | |
| Antioxidant | | 0.3 | 0.3 | 0.3 | 0.3 | 0.3 | 0.3 |
| Lubricant | | 0.01 | 0.01 | 0.01 | 0.01 | 0.01 | 0.01 |
| Organic peroxide | | 1.5 | 1.5 | 1.5 | 1.5 | 1.5 | 1.5 |
| Component (B)/component (C) | | 1.3 | 2.5 | 2.5 | 2.5 | 2.5 | 2.5 |
| Total content of maleic anhydride units in composition (parts by mass) | | 3 | 1 | 0.8 | 0.4 | 0.4 | 0.4 |
| Accumulated amount of space charges (%) | 50 kV/mm 90° C. | 7 | 9 | 11 | 60 | 45 | 35 |
| Volume resistivity (Ω · cm) | 50 kV/mm 90° C. | $3.1\times10^{16}$ | $2.8\times10^{16}$ | $2.1\times10^{16}$ | $2.0\times10^{15}$ | $4.3\times10^{15}$ | $7.0\times10^{15}$ |
| Evaluation | | A | A | A | B | B | B |
| Accumulated amount of space charges (%) | 75 kV/mm 90° C. | 8 | 12 | 19 | 95 | 82 | 79 |

TABLE 1-continued

| | | | | | | | |
|---|---|---|---|---|---|---|---|
| Volume resistivity (Ω · cm) | 75 kV/mm 90° C. | 1.3 × $10^{16}$ | 1.2 × $10^{16}$ | 1.1 × $10^{16}$ | 1.2 × $10^{15}$ | 1.6 × $10^{15}$ | 2.4 × $10^{15}$ |
| Evaluation | | A | A | A | B | B | B |
| DC Breakdown strength (kV/mm) | 90° C. | 242 | 249 | 249 | 246 | 244 | 256 |
| Evaluation | | A | A | A | A | A | A |
| Heat deformation ratio (%) | | 31 | 19 | 21 | 17 | 16 | 16 |
| Evaluation | | A | A | A | A | A | A |
| Rate of increase of resin pressure (%) | | 0.5 | 0.5 | 0.5 | 0.3 | 0.3 | 0.3 |
| Evaluation | | A | A | A | A | A | A |
| Rate of variation in DC breakdown strength (%) | | 12 | 16 | 14 | 10 | 8 | 10 |
| Evaluation | | A | A | A | A | A | A |

| | | A7 | A8 | A9 | A10 | A11 |
|---|---|---|---|---|---|---|
| Low density polyethylene | | 80 | 99.5 | 90 | | 90 |
| Polypropylene | | | | | 98 | |
| Maleic anhydride-modified polyethylene | Modification rate 0.3% | | | 5 | | |
| Styrene-based elastomer B1 | Ethylene content 20 mass % | | | | | |
| Styrene-based elastomer B2 | Ethylene content 37 mass % | | | | | |
| Styrene-based elastomer B3 | Ethylene content 44 mass % | 20 | 0.5 | 5 | 2 | 10 |
| Styrene-maleic anhydride copolymer C1 | Styrene content 75 mass % | | | | 2 | |
| Styrene-maleic anhydride copolymer C2 | Styrene content 80 mass % | 0.5 | 0.5 | 2 | | 4 |
| Styrene-maleic anhydride-allyl ether copolymer | | | | | | |
| Magnesium oxide | | | | | | 0.1 |
| Antioxidant | | 0.3 | 0.3 | 0.3 | | 0.3 |
| Lubricant | | 0.01 | 0.01 | 0.01 | | 0.01 |
| Organic peroxide | | 1.5 | 1.5 | 1.5 | | 1.5 |
| Component (B)/component (C) | | 40.0 | 1.0 | 2.5 | 1.0 | 2.5 |
| Total content of maleic anhydride units in composition (parts by mass) | | 0.1 | 0.1 | 0.415 | 0.5 | 0.8 |
| Accumulated amount of space charges (%) | 50 kV/mm 90° C. | 23 | 78 | 14 | 38 | 8 |
| Volume resistivity (Ω · cm) | 50 kV/mm 90° C. | 1.0 × $10^{16}$ | 2.4 × $10^{15}$ | 1.9 × $10^{16}$ | 4.6 × $10^{15}$ | 3.0 × $10^{16}$ |
| Evaluation | | A | B | A | B | A |
| Accumulated amount of space charges (%) | 75 kV/mm 90° C. | 31 | 96 | 25 | 99 | 10 |
| Volume resistivity (Ω · cm) | 75 kV/mm 90° C. | 6.5 × $10^{15}$ | 1.1 × $10^{15}$ | 8.6 x $10^{15}$ | 1.6 × $10^{15}$ | 1.2 × $10^{16}$ |
| Evaluation | | B | B | B | B | A |
| DC Breakdown strength (kV/mm) | 90° C. | 215 | 208 | 222 | 230 | 245 |
| Evaluation | | A | A | A | A | A |
| Heat deformation ratio (%) | | 15 | 17 | 15 | 2 | 18 |
| Evaluation | | A | A | A | A | A |
| Rate of increase of resin pressure (%) | | 0.3 | 0.3 | 0.4 | 0.3 | 0.7 |
| Evaluation | | A | A | A | A | A |
| Rate of variation in DC breakdown strength (%) | | 6 | 10 | 6 | 6 | 16 |
| Evaluation | | A | A | A | A | A |

TABLE 2

| | | B1 | B2 | B3 | B4 | B5 | B6 | B7 | B8 | B9 |
|---|---|---|---|---|---|---|---|---|---|---|
| Low density polyethylene | | 90 | 70 | 98 | 90 | 100 | 100 | 80 | 95 | 95 |
| Polypropylene | | | | | | | | | | |
| Maleic anhydride-modified polyethylene | Modification rate 0.3% | | | | | | | | 5 | 5 |
| Styrene-based elastomer B1 | Ethylene content 20 mass % | | | | | | | | | |

TABLE 2-continued

| | | B1 | B2 | B3 | B4 | B5 | B6 | B7 | B8 | B9 |
|---|---|---|---|---|---|---|---|---|---|---|
| Styrene-based elastomer B2 | Ethylene content 37 mass % | | | | | | | | | |
| Styrene-based elastomer B3 | Ethylene content 44 mass % | 10 | 30 | 2 | 10 | | | 20 | | |
| Styrene-maleic anhydride copolymer C1 | Styrene content 75 mass % | | | | | | | | | |
| Styrene-maleic anhydride copolymer C2 | Styrene content 80 mass % | 0.3 | 20 | 4 | | 4 | | | | |
| Styrene-maleic anhydride-allyl ether copolymer | | | | | | | | 2 | | |
| Magnesium oxide | | | | | | | | | | 2 |
| Antioxidant | | 0.3 | 0.3 | 0.3 | 0.3 | 0.3 | 0.3 | 0.3 | 0.3 | 0.3 |
| Lubricant | | 0.01 | 0.01 | 0.01 | 0.01 | 0.01 | 0.01 | 0.01 | 0.01 | 0.01 |
| Organic peroxide | | 1.5 | 1.5 | 1.6 | 1.5 | 1.5 | 1.5 | 1.5 | 1.5 | 1.5 |
| Component (B)/component (C) | | 33.3 | 15 | 0.5 | — | 0.0 | — | 10 | — | — |
| Total content of maleic anhydride units in composition (parts by mass) | | 0.06 | 4 | 0.8 | 0 | 0.8 | 0 | 0.5 | 0.015 | 0.015 |
| Accumulated amount of space charges (%) | 50 kV/mm 90° C. | 154 | 4 | 54 | 682 | 163 | 629 | 601 | 59 | 6 |
| Volume resistivity (Ω · cm) | 50 kV/mm 90° C. | $1.4 \times 10^{15}$ | $6.9 \times 10^{16}$ | $3.9 \times 10^{15}$ | $2.4 \times 10^{14}$ | $9.9 \times 10^{14}$ | $2.6 \times 10^{14}$ | $4.1 \times 10^{14}$ | $2.0 \times 10^{15}$ | $5.1 \times 10^{16}$ |
| Evaluation | | C | A | B | C | C | C | C | B | A |
| Accumulated amount of space charges (%) | 75 kV/mm 90° C. | 188 | 5 | 257 | — | — | — | — | 328 | 9 |
| Volume resistivity (Ω · cm) | 75 kV/mm 90° C. | $8.7 \times 10^{14}$ | $4.8 \times 10^{16}$ | $7.3 \times 10^{14}$ | — | — | — | — | $4.1 \times 10^{14}$ | $3.4 \times 10^{16}$ |
| Evaluation | | C | A | C | — | — | — | — | C | A |
| DC Breakdown strength (kV/mm) | 90° C. | 202 | 246 | 199 | 201 | 195 | 194 | 230 | 205 | 239 |
| Evaluation | | A | A | B | A | B | B | A | A | A |
| Heat deformation ratio (%) | | 15 | 42 | 21 | 15 | 20 | 15 | 18 | 16 | 15 |
| Evaluation | | A | B | A | A | A | A | A | A | A |
| Rate of increase of resin pressure (%) | | 0.3 | 0.7 | 0.6 | 0.2 | 0.5 | 0.2 | 0.3 | 0.3 | 10 |
| Evaluation | | A | A | A | A | A | A | A | A | B |
| Rate of variation in DC breakdown strength (%) | | 8 | 16 | 12 | 6 | 14 | 6 | 12 | 10 | 22 |
| Evaluation | | A | A | A | A | A | A | A | A | B |

(Sample B6)

For sample B6 which did not contain the styrene-based elastomer (B), the copolymer (C), and the inorganic filler, all of the accumulated amount of space charges and volume resistivity measured under condition of the DC electric field of 50 kV/mm, and the DC breakdown strength were bad. The reason is considered that sample B6 contains no material that suppresses local accumulation of space charges, resulting in degraded insulation properties.

(Sample B8)

For sample B8 which did not contain the styrene-based elastomer (B), the copolymer (C), and the inorganic filler but contained the maleic anhydride-modified polyethylene, all of the accumulated amount of space charges and volume resistivity, measured under condition of the DC electric field of 50 kV/mm, and the DC breakdown strength were good. However, both of the DC breakdown strength and the volume resistivity, measured under the severer condition of the DC electric field of 75 kV/mm, were bad. For samples B8, it is considered that the total content of the polar groups in the composition cannot be sufficiently ensured, so that the local accumulation of space charges cannot be suppressed under the severe condition.

(Sample B9)

For sample B9 which did not contain the styrene-based elastomer (B) and the copolymer (C) but contained the inorganic filler, the evaluation results for the insulation properties were good. However, the rate of increase of resin pressure in the extrusion step and the rate of variation in DC breakdown strength in the length direction of the cable were bad. For sample B9, it is considered that the insulation properties varies in the length direction of the cable because the mesh becomes clogged due to agglomeration of the inorganic fillers in the insulating layer extrusion step.

(Sample B1 and B4)

For sample B1 in which the content of the copolymer (C) was less than 0.5 parts by mass and sample B4 which did not contain the copolymer (C), the total content of the maleic anhydride units in the composition was less than 0.1 parts by mass. In these samples, the DC breakdown strength was good whereas the accumulated amount of space charges and the volume resistivity, measured under the condition of the DC electric field of 50 kV/mm, were bad. For samples B1 and B4, it is considered that the total content of the maleic anhydride units in the composition cannot be sufficiently ensured, so that the space charges cannot be sufficiently trapped by the maleic anhydride units.

(Sample B3 and B5)

Sample B3 in which the content of the styrene-based elastomer (B) was less than the content of the copolymer (C) (i.e., a ratio of the component (B)/component (C) was less than 1) and sample B5 which did not contain the styrene-based elastomer (B) had good DC breakdown strength. However, for sample B5, the accumulated amount of space charges and the volume resistivity, measured under the condition of the DC electric field of 50 kV/mm, were bad. On the other hand, for sample B3, although the insulation properties were slightly better, the accumulation amount of space charges and the volume resistivity, measured under the condition of a DC electric field of 75 kV/mm, were bad. For samples B3 and B5, the styrene-based elastomer (B) cannot be sufficiently interposed in the base resin (A), and the copolymer (C) cannot be uniformly dispersed. Therefore, it is considered that the local accumulation of space charges cannot be suppressed.

(Sample B2)

For sample B2 in which the content of the copolymer (C) was 20 parts by mass or more, the insulation properties were good, whereas the heat deformation ratio was bad. For sample B2, it is considered that the styrene units in the copolymer (C) make large contribution to the deformation, which makes the insulating layer liable to deform at high temperatures.

(Sample B7)

For sample B7 which contained a styrene-maleic anhydride-allyl ether copolymer as the copolymer (C), all of the accumulated amount of space charges and the volume resistivity, measured under the condition of the DC electric field of 50 kV/mm, and the DC breakdown strength were bad. In sample B7, allyl ether in the copolymer (C) was eliminated and decomposed in the extrusion step or crosslinking step, generating low molecular weight components. Therefore, the low molecular weight components were locally accumulated as space charges. As a result, it is considered that the insulation properties are degraded.

(Samples A1 to A11)

Samples A1 to A11 satisfied the respective requirements for the content of the copolymer (C), the total content of the maleic anhydride units in the composition, and the side chains of the copolymer (C). As for the results for samples A1 to A11, all of the accumulated amount of space charges and the volume resistivity, measured under each of the conditions of the DC electric fields of 50 kV/mm and 75 kV/mm, and the DC breakdown strength were good. Further, the heat deformation ratio was good. Furthermore, the rate of increase of resin pressure in the extrusion step and the rate of variation in DC breakdown strength in the length direction of the cable were good.

For samples A1 to A11, by setting the content of the copolymer (C) to 0.5 parts by mass or more, the total content of the maleic anhydride units in the composition can be 0.1 parts by mass or more. Thus, the space charges can be sufficiently trapped by the maleic anhydride units. As a result, it is confirmed that the insulating layer can be made high-withstand-voltage even at high temperatures.

Among them, for samples A1 to A3 in which the content of the copolymer (C) was 4 parts by mass or more, the accumulated amount of space charges and the volume resistivity, measured under the condition of the DC electric field of 75 kV/mm, were best.

For samples A1 to A3, the total content of the maleic anhydride units in the composition can be 0.8 parts by mass or more. Thus, the space charges can be stably trapped by the maleic anhydride units. As a result, it is confirmed that more stable insulation properties can be obtained.

For samples A1 to A11, it is confirmed that the copolymer (C) does not contain a side chain that is eliminated by pyrolysis or hydrolysis at 300° C. or less, so that the accumulation of space charges in the low molecular weight component can be suppressed.

For samples A1 to A11, by setting the content of the copolymer (C) to less than 20 parts by mass, the contribution of the styrene units in the copolymer (C) to the deformation can be reduced. As a result, it is confirmed that the deformation of the power cable at high temperatures can be suppressed.

For samples A1 to A10, by setting the content of the inorganic compounds (inorganic fillers) in the composition to less than 0.01 parts by mass, the clogging of the mesh can be suppressed in the insulating layer extrusion step. As a result, it is confirmed that variation in the insulation properties in the length direction can be suppressed.

On the other hand, for sample A11, since it contains less than 1 part by mass of the inorganic filler, it is confirmed that the effect of improving the insulation properties of the insulating layer can be stably obtained while suppressing the clogging of the mesh in the extrusion step.

For sample A9, since the base resin (A) further contains maleic anhydride-modified polyethylene, the total content of the maleic anhydride units can be increased. As a result, it is confirmed that the local accumulation of space charges can be stably suppressed.

Preferred Aspect of Disclosure

Hereinafter, supplementary descriptions of the preferred aspects of the present disclosure will be given.

Supplementary Description 1

A resin composition including:

a base resin (A) containing polyolefin;

a styrene-based elastomer (B) containing styrene units; and a copolymer (C) containing styrene units and maleic anhydride units, wherein a content of the copolymer (C) is 0.5 parts by mass or more with respect to a total content of the base resin (A) and the styrene-based elastomer (B) being 100 parts by mass, a content of the styrene-based elastomer (B) is equal to or more than the content of the copolymer (C), and the copolymer (C) does not contain a side chain that is eliminated by pyrolysis or hydrolysis at 300° C. or less.

Supplementary Description 2

A power cable including:

a conductor; and an insulating layer provided to cover a circumference of the conductor;

wherein the insulating layer includes a resin composition having a base resin (A) containing polyolefin, a styrene-based elastomer (B) containing styrene units, and a copolymer (C) containing styrene units and maleic anhydride units, a content of the copolymer (C) in the insulating layer is 0.5 parts by mass or more with respect to a total content of the base resin (A) and the styrene-based elastomer (B) being 100 parts by mass, a content of the styrene-based elastomer (B) in the insulating layer is equal to or more than the content of the copolymer (C), and the copolymer (C) does not contain a side chain that is eliminated by pyrolysis or hydrolysis at 300° C. or less.

Supplementary Description 3

The power cable according to supplementary description 2, wherein a total content of the maleic anhydride units in the insulating layer is 0.1 parts by mass or more with respect to the total content of the base resin (A) and the styrene-based elastomer (B) being 100 parts by mass.

Supplementary Description 4

A power cable including:

a conductor; and an insulating layer provided to cover a circumference of the conductor;

wherein the insulating layer includes a resin composition having a base resin (A) containing polyolefin, a styrene-based elastomer (B) containing styrene units, and a copolymer (C) containing styrene units and maleic anhydride units, a total content of the maleic anhydride units in the insulating layer is 0.1 parts by mass or more with respect to a total content of the base resin (A) and the styrene-based elastomer (B) being 100 parts by mass, a content of the styrene-based elastomer (B) in the insulating layer is equal to or more than the content of the copolymer (C), and the copolymer (C) does not contain a side chain that is eliminated by pyrolysis or hydrolysis at 300° C. or less.

Supplementary Description 5

The power cable according to any one of supplementary descriptions 2 to 4, wherein the copolymer contains none of the following bonds: an ester-bond, an ether-bond, an amide-bond, a urethane-bond, and a siloxane-bond.

Supplementary Description 6

The power cable according to any one of supplementary descriptions 2 to 5, wherein a volume resistivity of a sheet of the insulating layer measured under the condition at a temperature of 90° C. and a DC electric field of 75 kV/mm is $1.0\times10^{15}$ Ω·cm or more.

Supplementary Description 7

The power cable according to any one of supplementary descriptions 2 to 6, wherein an accumulated amount of space charges of a sheet of the insulating layer measured under the condition at a temperature of 90° C. and a DC electric field of 75 kV/mm is 100% or less.

Supplementary Description 8

The power cable according to any one of supplementary descriptions 2 to 7, wherein a content of the copolymer (C) is less than 20 parts by mass with respect to the total content of the base resin (A) and the styrene-based elastomer (B) being 100 parts by mass.

Supplementary Description 9

The power cable according to supplementary description 7 or 8, wherein a heat deformation ratio of the insulating layer measured under the condition at a temperature of 120° C. and a load of 2 kg is 40% or less.

Supplementary Description 10

The power cable according to any one of supplementary descriptions 2 to 9, wherein a content of an inorganic compound contained in the insulating layer is less than 0.01 parts by mass with respect to the total content of the base resin (A) and the styrene-based elastomer (B) being 100 parts by mass.

Supplementary Description 11

The power cable according to any one of supplementary descriptions 2 to 9, wherein the insulating layer further has less than 1 part by mass of an inorganic filler with respect to the total content of the base resin (A) and the styrene-based elastomer (B) being 100 parts by mass.

Supplementary Description 12

The power cable according to supplementary description 10 or 11, wherein the insulating layer satisfies the following equation (1) for a rate of variation in DC breakdown strength:

$$(E_{MAX}-E_{MIN})/E_{AVE}\leq 0.2 \qquad (1)$$

where the DC breakdown strength is an electric field strength at which dielectric breakdown occurs in each of a plurality of sheets when a DC electric field is applied under the condition at a temperature of 90° C. to each of the plurality of sheets that are collected from a plurality of positions in the insulating layer, spaced at predetermined intervals in the length direction of the conductor, and $E_{MAX}$, $E_{MIN}$, and $E_{AVE}$ are the maximum, minimum, and average values, respectively, of the DC breakdown strengths of the plurality of sheets.

Supplementary Description 13

The power cable according to any one of supplementary descriptions 2 to 12, wherein a glass transition temperature of the copolymer (C) is 110° C. or more.

Supplementary Description 14

The power cable according to any one of supplementary descriptions 2 to 13, wherein a glass transition temperature of the copolymer (C) is 140° C. or less.

Supplementary Description 15

The power cable according to any one of supplementary descriptions 2 to 14, wherein an elastic modulus of the polyolefin measured with a scanning probe microscope is 200 MPa or more and 2000 MPa or less.

Supplementary Description 16

The power cable according to any one of supplementary descriptions 2 to 15, wherein an elastic modulus of the styrene-based elastomer (B) measured with a scanning probe microscope is 10 MPa or more and 200 MPa or less.

Supplementary Description 17

The power cable according to any one of supplementary descriptions 2 to 16, wherein the base resin (A) further contains maleic anhydride-modified polyolefin.

Supplementary Description 18

The power cable according to any one of supplementary descriptions 2 to 17, wherein the base resin contains polyethylene, and the styrene-based elastomer (B) contains ethylene units.

Supplementary Description 19

A method of producing a power cable, including:

preparing a resin composition having a base resin (A) containing polyolefin, a styrene-based elastomer (B) containing styrene units, and a copolymer (C) containing styrene units and maleic anhydride units; and, forming an insulating layer with the resin composition to cover an outer circumference of a conductor, wherein, in the preparation of the resin composition, a content of the copolymer (C) in the resin composition is set to 0.5 parts by mass or more with respect to a total content of the base resin (A) and the styrene-based elastomer (B) being 100 parts by mass, a content of the styrene-based elastomer (B) in the resin composition is set to be equal to or more than the content of the copolymer (C), and the copolymer (C) is a material without containing a side chain that is eliminated by pyrolysis or hydrolysis at 300° C. or less.

Supplementary Description 20

A method of producing a power cable, including:

preparing a resin composition having a base resin (A) containing polyolefin, a styrene-based elastomer (B) containing styrene units, and a copolymer (C) containing styrene units and maleic anhydride units; and forming an insulating layer with the resin composition to cover an outer circumference of a conductor, wherein, in the preparation of the resin composition, a total content of the maleic anhydride units in the resin composition is set to 0.1 parts by mass or more with respect to a total content of the base resin (A) and the styrene-based elastomer (B) being 100 parts by mass, a content of the styrene-based elastomer (B) in the resin composition is set to be equal to or more than the content of the copolymer (C), and the copolymer (C) is a material without containing a side chain that is eliminated by pyrolysis or hydrolysis at 300° C. or less.

REFERENCE SIGNS LIST

10 DC power cable
110 Conductor
120 Internal semiconductive layer
130 Insulating layer
140 External semiconductive layer
150 Shielding layer
160 Sheath

The invention claimed is:

1. A resin composition comprising:

a base resin containing polyolefin;

a styrene-based elastomer containing styrene units; and a copolymer containing styrene units and maleic anhydride units, wherein a content of the copolymer is 0.5 parts by mass or more with respect to a total content of the base resin and the styrene-based elastomer being 100 parts by mass, a content of the styrene-based elastomer is equal to or more than the content of the copolymer, and the copolymer does not contain a side chain that is eliminated by pyrolysis or hydrolysis at 300° C. or less.

2. A power cable comprising:

a conductor; and an insulating layer provided to cover a circumference of the conductor;

wherein the insulating layer includes a resin composition having a base resin containing polyolefin, a styrene-based elastomer containing styrene units, and a copolymer containing styrene units and maleic anhydride units, a content of the copolymer in the insulating layer is 0.5 parts by mass or more with respect to a total content of the base resin and the styrene-based elastomer being 100 parts by mass, a content of the styrene-based elastomer in the insulating layer is equal to or more than the content of the copolymer, and the copolymer does not contain a side chain that is eliminated by pyrolysis or hydrolysis at 300° C. or less.

3. The power cable according to claim 2, wherein a total content of the maleic anhydride units in the insulating layer is 0.1 parts by mass or more with respect to the total content of the base resin (A) and the styrene-based elastomer (B) being 100 parts by mass.

4. A power cable comprising:

a conductor; and an insulating layer provided to cover a circumference of the conductor;

wherein the insulating layer includes a resin composition having a base resin containing polyolefin, a styrene-based elastomer containing styrene units, and a copolymer containing styrene units and maleic anhydride units, a total content of the maleic anhydride units in the insulating layer is 0.1 parts by mass or more with respect to a total content of the base resin and the styrene-based elastomer being 100 parts by mass, a content of the styrene-based elastomer in the insulating layer is equal to or more than the content of the copolymer, and the copolymer does not contain a side chain that is eliminated by pyrolysis or hydrolysis at 300° C. or less.

5. The power cable according to claim 2, wherein the copolymer contains none of the following bonds: an ester-bond, an ether-bond, an amide-bond, a urethane-bond, and a siloxane-bond.

6. The power cable according to claim 2, wherein a volume resistivity of a sheet of the insulating layer measured under the condition at a temperature of 90° C. and a DC electric field of 75 kV/mm is $1.0\times10^{15}$ Ω·cm or more.

7. The power cable according to claim 2, wherein an accumulated amount of space charges of a sheet of the insulating layer measured under the condition at a temperature of 90° C. and a DC electric field of 75 kV/mm is 100% or less.

8. The power cable according to claim 2, wherein a content of the copolymer is less than 20 parts by mass with respect to the total content of the base resin and the styrene-based elastomer being 100 parts by mass.

9. The power cable according to claim 7, wherein a heat deformation ratio of the insulating layer measured under the condition at a temperature of 120° C. and a load of 2 kg is 40% or less.

10. The power cable according to claim 2, wherein a content of an inorganic compound contained in the insulating layer is less than 0.01 parts by mass with respect to the total content of the base resin and the styrene-based elastomer being 100 parts by mass.

11. The power cable according to claim 2, wherein the insulating layer further has less than 1 part by mass of an inorganic filler with respect to the total content of the base resin and the styrene-based elastomer being 100 parts by mass.

12. The power cable according to claim 10, wherein the insulating layer satisfies the following equation (1) for a rate of variation in DC breakdown strength:

$$(E_{MAX} - E_{MIN})/E_{AVE} \leq 0.2 \quad (1)$$

where the DC breakdown strength is an electric field strength at which dielectric breakdown occurs in each of a plurality of sheets when a DC electric field is applied under the condition at a temperature of 90° C. to each of the plurality of sheets that are collected from a plurality of positions in the insulating layer, spaced at predetermined intervals in the length direction of the conductor, and $E_{MAX}$, $E_{MIN}$, and $E_{AVE}$ are the maximum, minimum, and average values, respectively, of the DC breakdown strengths of the plurality of sheets.

13. The power cable according to claim 2, wherein a glass transition temperature of the copolymer is 110° C. or more.

14. The power cable according to claim 2, wherein a glass transition temperature of the copolymer is 140° C. or less.

15. A method of producing a power cable, comprising:

preparing a resin composition having a base resin containing polyolefin, a styrene-based elastomer containing styrene units, and a copolymer containing styrene units and maleic anhydride units; and forming an insulating layer with the resin composition to cover an outer circumference of a conductor, wherein, in the preparation of the resin composition, a content of the copolymer in the resin composition is set to 0.5 parts by mass or more with respect to a total content of the base resin and the styrene-based elastomer being 100 parts by mass, a content of the styrene-based elastomer in the resin composition is set to be equal to or more than the content of the copolymer, and the copolymer is a material without containing a side chain that is eliminated by pyrolysis or hydrolysis at 300° C. or less.

16. A method of producing a power cable, comprising:

preparing a resin composition having a base resin containing polyolefin, a styrene-based elastomer containing styrene units, and a copolymer containing styrene units and maleic anhydride units; and forming an insulating layer with the resin composition to cover an outer circumference of a conductor, wherein, in the preparation of the resin composition, a total content of the maleic anhydride units in the resin composition is set to 0.1 parts by mass or more with respect to a total content of the base resin and the styrene-based elastomer being 100 parts by mass, a content of the styrene-based elastomer in the resin composition is set to be equal to or more than the content of the copolymer, and the copolymer is a material without containing a side chain that is eliminated by pyrolysis or hydrolysis at 300° C. or less.

* * * * *